(12) United States Patent
Van Keuren, III

(10) Patent No.: US 6,231,329 B1
(45) Date of Patent: May 15, 2001

(54) LOCKING APPARATUS FOR A MOVABLE PLATEN

(75) Inventor: Frederick F. Van Keuren, III, Cincinnati, OH (US)

(73) Assignee: Milacron Inc., Cincinnati, OH (US)

( * ) Notice: Subject to any disclaimer, the term of this patent is extended or adjusted under 35 U.S.C. 154(b) by 0 days.

(21) Appl. No.: 09/326,237

(22) Filed: Jun. 4, 1999

(51) Int. Cl.[7] ................................................. B29C 45/64
(52) U.S. Cl. ........................... 425/169; 425/590; 425/595
(58) Field of Search ................................. 425/169, 589, 425/590, 595, 450.1, 451.2, 451.9

(56) References Cited

U.S. PATENT DOCUMENTS

| | | | |
|---|---|---|---|
| 3,590,437 | * 7/1971 | Annis, Jr. et al. | 425/590 |
| 3,669,599 | 6/1972 | Snider et al. | 425/242 |
| 3,729,283 | * 4/1973 | Eggenberger et al. | 425/590 |
| 3,951,579 | 4/1976 | Myers | 425/190 |
| 4,059,383 | 11/1977 | Tsutsumi | 425/451.6 |
| 5,407,342 | * 4/1995 | Boucher et al. | 425/590 |
| 5,868,989 | 2/1999 | Glaesener et al. | 264/328.1 |

* cited by examiner

*Primary Examiner*—James P. Mackey
(74) *Attorney, Agent, or Firm*—Stephen H. Friskney

(57) ABSTRACT

A locking apparatus secures a movable platen in position relative to strain rods on which the movable platen is slidably carried. The locking apparatus includes split nuts that are carried by the movable platen and are pivotable about respective pivot axes between a first position in which the split nuts engage the strain rods and a second position in which the split nuts are pivoted away from the strain rods. The strain rods include grooved sections and the split nuts carry internal grooved portions that are complementary with the grooved portions of the strain rods so that the split nuts are engageable with the grooved portions of the strain rods to retain the movable platen in a desired position during a molding operation. Respective pairs of split nuts are actuated simultaneously by a piston and cylinder arrangement that causes movement of a primary pair of links to move the halves of one split nut and a pair of secondary links that extend from the one split nut to the other split nut so that the split nut halves are each operated by the same cylinder. The lengths of the primary and secondary links are adjustable to enable the first and second split nuts to be moved simultaneously through the same degree of arc.

19 Claims, 7 Drawing Sheets

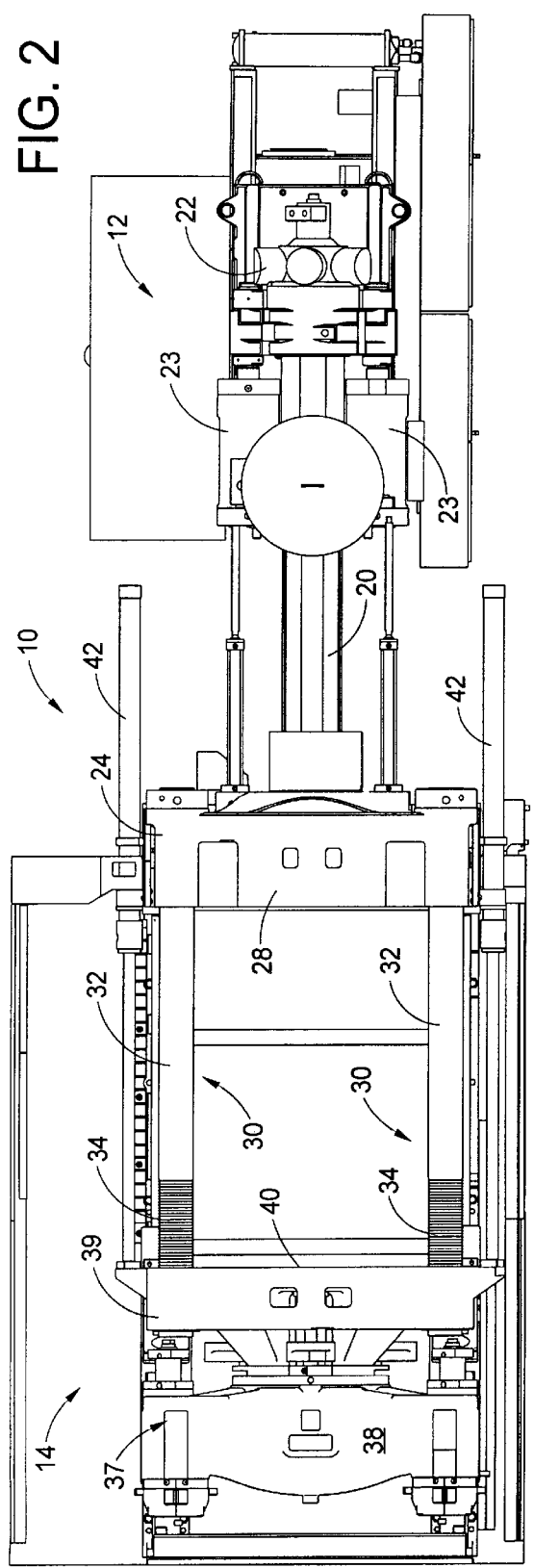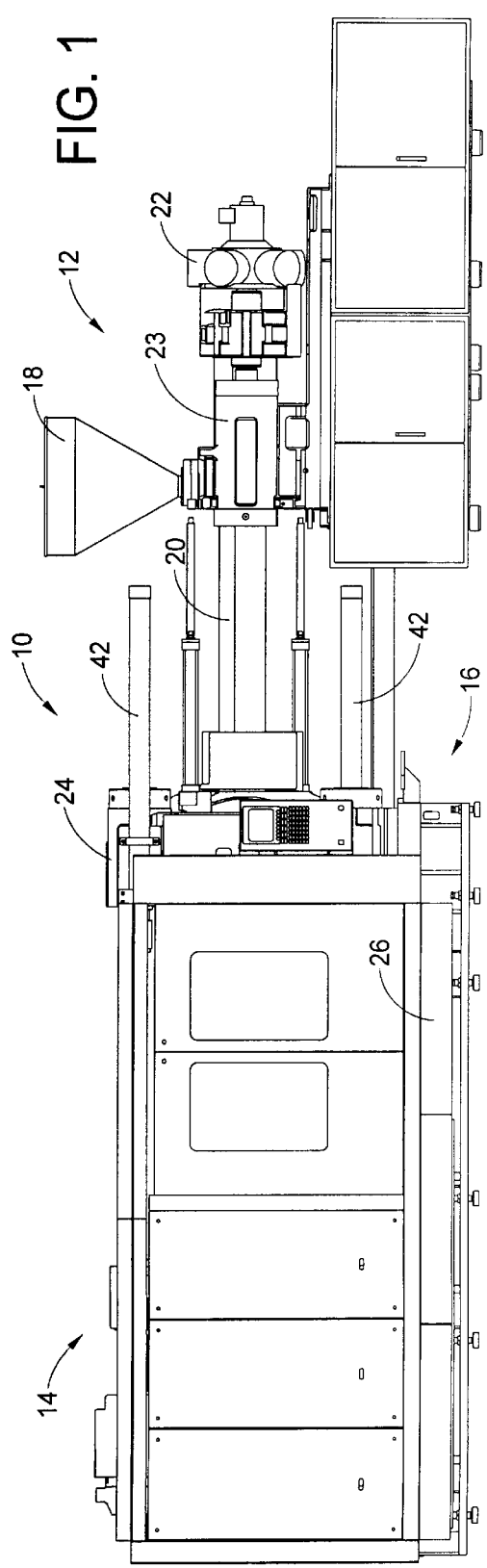

LOCKING APPARATUS FOR A MOVABLE PLATEN

BACKGROUND OF THE INVENTION

1. Field of the Invention

The present invention relates to mold clamping systems for injection molding machines and, more particularly, to a structural arrangement for locking a movable platen to a plurality of strain rods during the mold clamping and holding phase of an injection molding cycle.

2. Description of the Related Art

Large capacity, hydraulically-operated injection molding machines of the prior art generally incorporate a mold clamping system that includes three distinct platens, two spaced, opposed, stationary platens and a movable platen positioned between the stationary platens. Four parallel strain rods extend between and connect with each of the stationary platens, and the movable platen is carried on and movable along the strain rods. One of the stationary platens supports one portion of a mold and the movable platen supports a cooperating mold portion that defines a mold cavity when the two mold portions are brought together. The movable platen is usually moved toward and away from the mold-carrying stationary platen by a large diameter hydraulic piston and cylinder that also provides the clamping force to hold the mold portions together during high pressure injection of molten molding material into the mold cavity. The large diameter, long stroke piston requires a large volume of hydraulic fluid to move the movable platen, and the axial length and the weight of the movable platen are quite high, resulting in relatively slow clamping phases of a molding cycle, and a relatively long overall machine length.

In an effort to reduce the size of such machines, and to provide a movable platen having less weight and therefore less inertia, an alternative mold clamping system was developed that typically includes only two primary platens, one stationary platen and one movable platen. To maintain the mold halves in tightly contacting relationship during the mold clamping and injection phases of the molding cycle in such a system, the movable platen must be securely held in place relative to strain rods that connect to the stationary platen.

Several approaches have been proposed for locking a movable platen to the clamping system strain rods in a two-platen mold clamping system. For example, in U.S. Pat. No. 3,669,599, entitled "Hydro-Mechanical Clamp," which issued on Jun. 13, 1972, to T. O. Snider et al., there is disclosed a locking arrangement incorporating pairs of scissor-type blocking arms to engage with and clamp around threaded portions of strain rods for holding the movable platen at a particular position on the strain rods, and for preventing movement of the movable platen away from the stationary platen and along the strain rods during the molding material injection phase of the molding cycle. The Snider et al. structure includes a complicated cam and link arrangement.

Another approach to providing a locking structure for a movable platen is disclosed in U.S. Pat. No. 4,059,383, entitled "Mold Opening And Locking Mechanism In An Injection Molding Machine Or The Like," which issued on Nov. 22, 1997, to Tsutsumi. In that approach an actuator is provided to actuate a locking arrangement to move a plurality of locking plates into and out of engagement with a gap provided between an annular supporting panel and a lock adjusting member.

A further approach to connect a platen to a strain rod is shown in U.S. Pat. No. 3,951,579, entitled "Apparatus for Facilitating Access to the Mold Halves of a Molding Machine," which issued on Apr. 20, 1976, to Myers et al. In the Myers et al. structure an actuating cylinder is provided adjacent one of the strain rods to move clamping arms into and out of engagement with the strain rod to clamp the strain rod to a stationary platen. When the clamping arms are opened, the strain rod can be retracted from the stationary platen to provide larger access to the mold halves.

A still further approach is disclosed in U.S. Pat. No. 5,868,989 entitled "Method For Clamping Platens Of Injection Molding Machines," which issued on Feb. 9, 1999 to Glaesener et al. A locking arrangement is disclosed that includes rotatable, toothed, hollow pistons that include circumferentially spaced, axially aligned internal teeth that are engageable with corresponding teeth formed on the clamping system strain rods. When the respective teeth are engaged, axial movement of a strain rod relative to a piston is prevented.

Although several arrangements have been disclosed for locking a platen relative to strain rods of a mold clamping system, the disclosed arrangements involve either apparatus that requires considerable motion of the locking elements, thereby extending the overall molding cycle operating time, or they involve relatively complex mechanisms that add significantly to the cost of machines that incorporate such arrangements. It is an object of the present invention to overcome the limitations of the heretofore-disclosed devices and to provide a locking arrangement that involves minimal motion, and thereby a shorter cycle time, and that also involves a simpler, less costly construction.

SUMMARY OF THE INVENTION

Briefly stated, in accordance with one aspect of the present invention, a mold clamping apparatus is provided that includes a locking arrangement for locking a movable platen assembly to a plurality of spaced, parallel strain rods. The apparatus includes a machine base that has a pair of parallel, laterally spaced supporting rails on which the movable platen assembly is adapted to be supported for sliding movement toward and away from a stationary platen. The stationary platen is secured to the base and extends across the support rails and includes a face that defines a mold support surface for supporting a first mold half.

A plurality of parallel strain rods extend from the mold-carrying face of the stationary platen, each strain rod including a smooth-surface portion having a uniform cross-section, and a locking portion having a plurality of axially-spaced, annular external grooves. The movable platen assembly is carried on the strain rods for sliding movement therealong toward and away from the stationary platen. Preferably, the movable platen assembly comprises a cylinder platen and a mold mounting platen having a face disposed opposite to the mold-carrying face of the stationary platen for supporting a second mold half that is cooperatively engageable with the first mold half to define a closed mold cavity therebetween.

The cylinder platen includes a rear surface that faces in a direction opposite from that of the mold-carrying face the mold mounting platen. Locking apparatus is carried on the rear surface of the cylinder platen for locking the movable platen assembly to the locking portion of the strain rods. The locking apparatus includes a first pair of spit nuts each pivotably supported by the movable platen for pivotable movement relative to the strain rod longitudinal axis about respective spaced pivot axis. The split nuts are movable between an engaged position in which each of the split nuts is engaged with the locking portion of a strain rod and a disengaged position in which the split nuts are separated from the strain rod.

A fluid-operated cylinder is carried by the cylinder platen for moving an actuator plate between a locked position and an unlocked position. A pair of first links extend from the actuator plate to respective halves of a first split nut and are connected with the split nuts at points spaced from the respective split nut pivot axis. A pair of second links each extend from one of the halves of the first split nut to a corresponding half of a second split nut that surrounds a second strain rod. The second split nuts halves are each individually pivotable about respective spaced pivot axis. Movement of the actuator plate by the fluid operated cylinder simultaneously moves the first and second links to pivot the respective halves of each of the first and second split nuts between: (a) an engaged position, wherein the split nuts securely engage the locking portions of the respective strain rods to block movement of the cylinder platen along the strain rods and (b) a disengaged position, wherein the split nuts have been pivoted away from the respective strain rods to disengage from the strain rod locking portions to permit movement of the movable platen assembly along the strain rods.

BRIEF DESCRIPTION OF THE DRAWINGS

FIG. 1 is a side elevational view of an injection molding machine incorporating a mold clamping system in accordance with the present invention.

FIG. 2 is a top view of the injection molding machine shown in FIG. 1.

DESCRIPTION OF THE PREFERRED EMBODIMENTS

Figure 3:
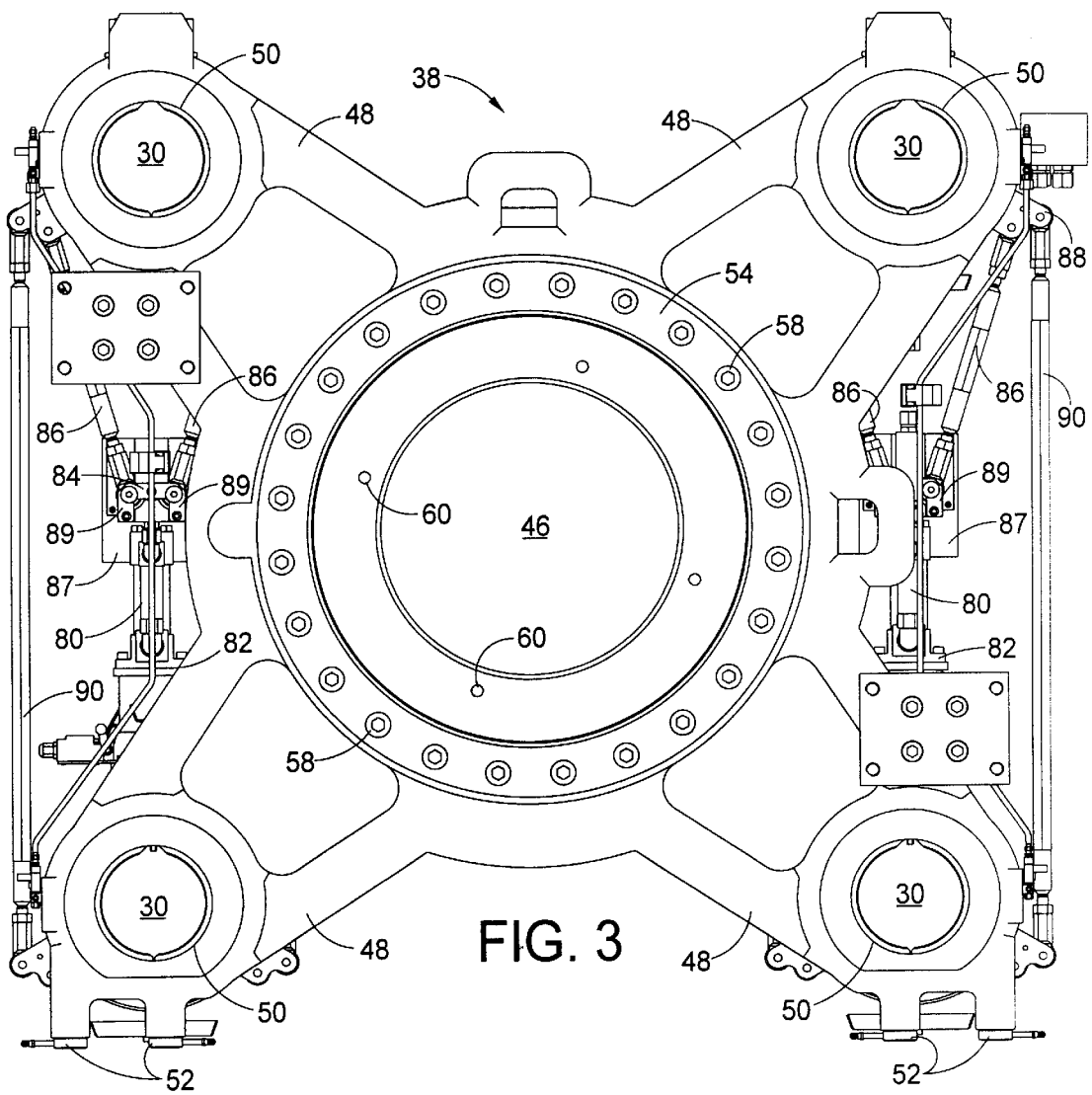
FIG. 3 is a front elevational view of a cylinder platen forming part of a mold clamping system in accordance with the present invention.
Figure 4:
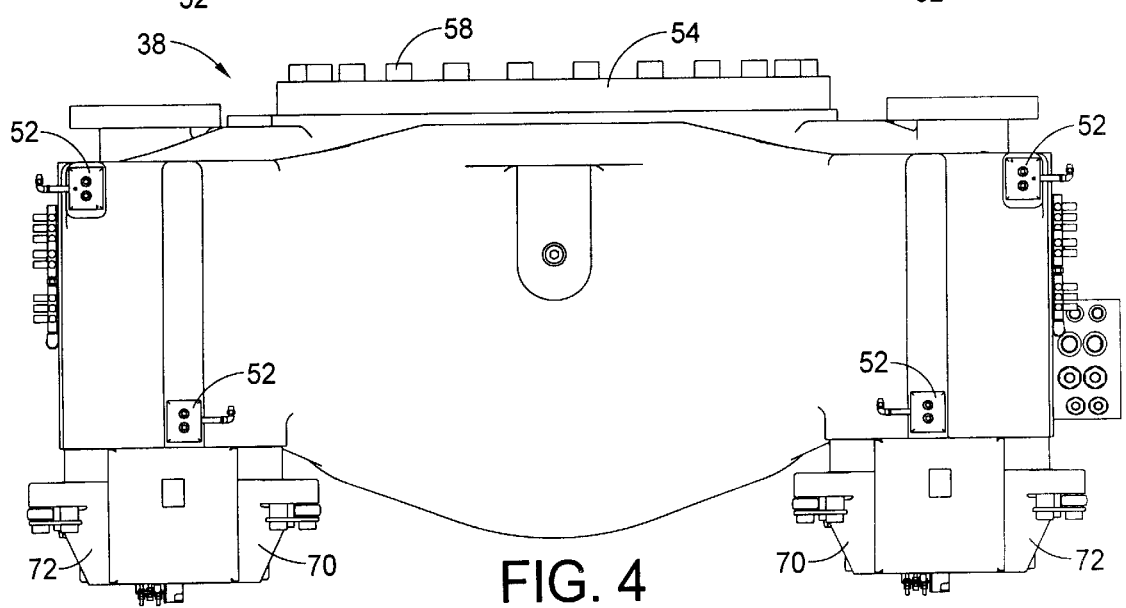
FIG. 4 is a bottom view of the cylinder platen shown in FIG. 3.

Referring now to the drawings, and in particular to FIGS. 1 and 2 thereof, there is shown an injection molding machine 10 that includes an injection unit 12 and a mold clamping unit 14, each of which is carried on a machine base 16. The injection unit 12 includes a material feed hopper 18 for receiving and feeding powdered or pelletized plastic material to a plastication barrel 20 within which a plastication screw (not shown) is carried, both for rotation within the barrel as well as for linear movement therewithin. A suitable hydraulic motor 22 can be provided for rotating the plastication screw. Hydraulic cylinders 23 are actuated to cause the screw to translate within the barrel 20 for injection of the molten plastic.

Mold clamping unit 14 of the machine 10 includes a stationary platen 24 that is carried on a pair of bed rails 26 forming part of the machine base 16. The bed rails 26 are substantially parallel to each other and extend in a direction away from the rear face 28 of the stationary platen 24, which is the face to which a mold half (not shown) can be secured. Extending from the stationary platen 24 in a direction opposite from the injection unit 12 are four strain rods 30, only two of which are visible in FIG. 2. The strain rods 30 are parallel to each other and are disposed in a generally rectangular array, as viewed in a plane transverse to their respective axes. Each of the strain rods 30 includes a smooth surface portion 32 that extends for a predetermined distance from the rear face 28 of the stationary platen 24, and each also includes a grooved surface portion 34 that extends for a predetermined distance from the end outermost end of the smooth surface portion 32. Slidably carried on the bed rails 26 and guided by the strain rods 30 is a movable platen assembly 37 that comprises a cylinder platen 38 and a mold mounting platen 39 having a front face 40 that is adapted to receive a second mold half (not shown) that is cooperatively engageable with the first mold half to define a mold cavity therebetween. Rapid traverse movement of the platen assembly 37 along the bed rails 26 is effected by a pair of diametrically positioned hydraulic cylinders 42 carried on the stationary platen 28 and connected with the movable platen assembly 37.

The construction of the cylinder platen 38 is shown in FIGS. 3 through 5, 7, and 8. As shown, the cylinder platen 38 is of generally rectangular configuration and includes a centrally positioned, large diameter, short length hydraulic cylinder 44, sometimes referred to as a "pancake cylinder," within which a similarly large diameter ram 46, sometimes referred to as a "pancake ram," is adapted to be received for sliding movement within the pancake cylinder. Four circumferentially spaced ears 48 extend outwardly from the pancake cylinder 44 and each ear includes a bore 50 for slidably receiving a respective one of the strain rods. A plurality of wear pads 52 are provided on the lowermost surfaces of the cylinder platen 38 for minimizing sliding friction between the cylinder platen 38 and the bed rails 26.

Figure 7:
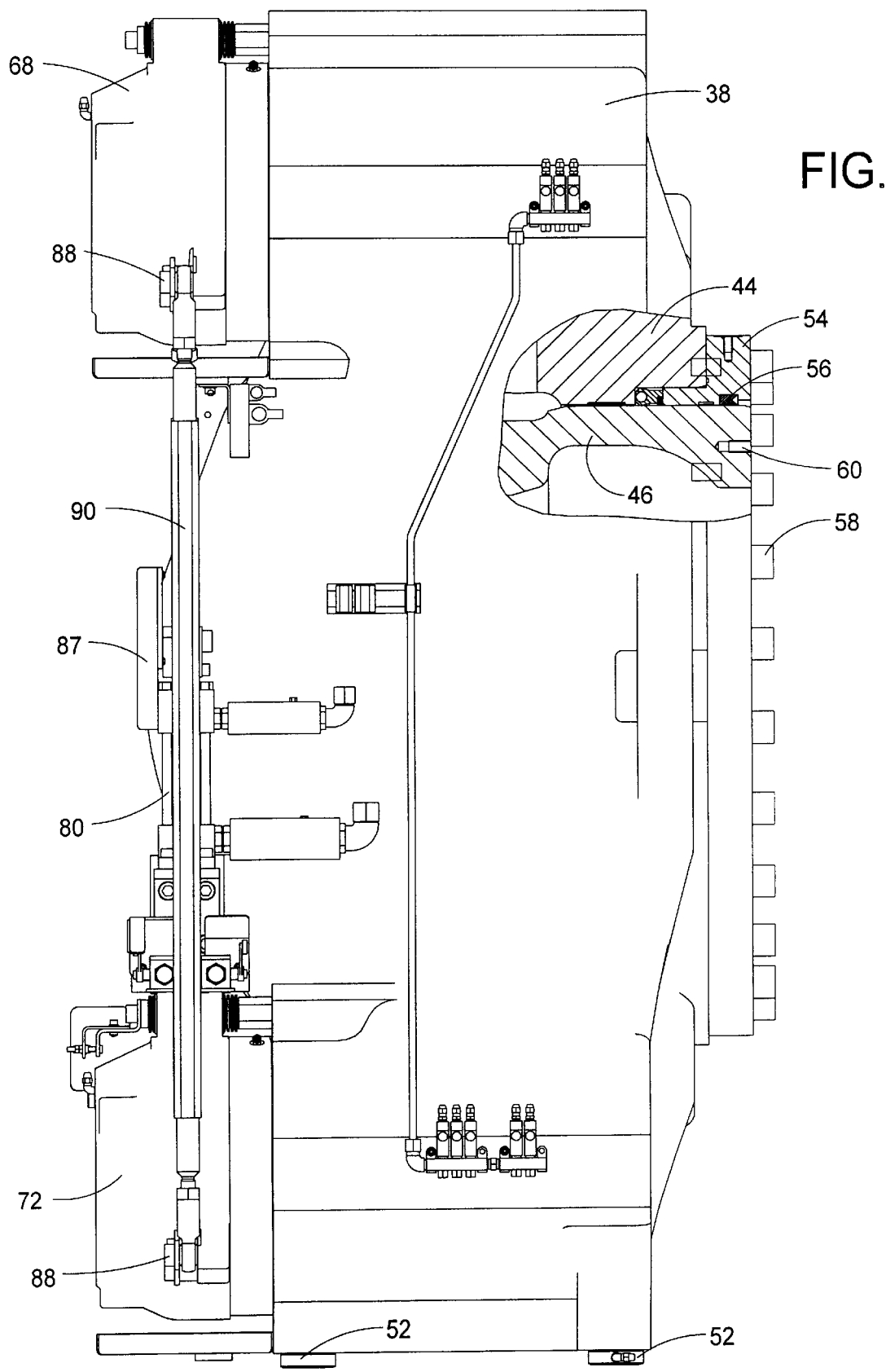
FIG. 7 is a left side elevational view of the cylinder platen shown in FIG. 3.
Figure 8:
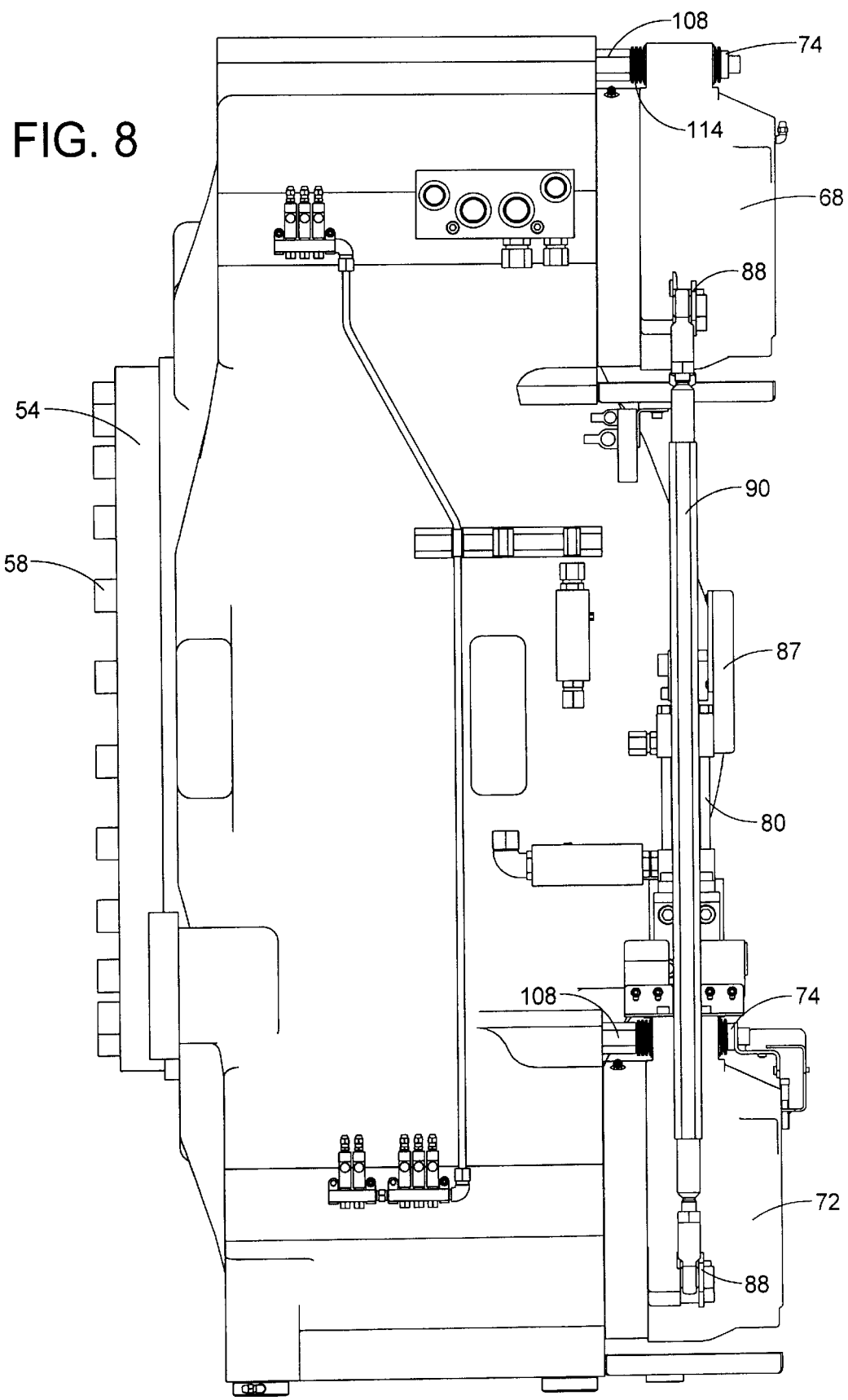
FIG. 8 is a right side elevational view of the cylinder platen shown in FIG. 3.

As best seen in FIGS. 3 and 7, the pancake cylinder 44 carries an annular seal retainer ring 54 that surrounds and engages the outer periphery of the pancake ram 46 to carry one or more annular seals 56 to prevent hydraulic fluid from leaking between the pancake cylinder 44 and the outer periphery of the pancake ram 46. The seal retainer ring 54 is secured to the cylinder platen 38 by a plurality of bolts 58. The pancake ram 46 includes a plurality of threaded holes 60 for attaching the mold mounting platen 39 (FIG. 1) to which a mold half (not shown) is mounted, so that upon linear movement of the pancake ram 46 within the pancake cylinder 44, the mold half carried by the movable platen assembly 37 is moved in a direction toward and away from the mold half carried by the stationary platen 24.

Figure 5:
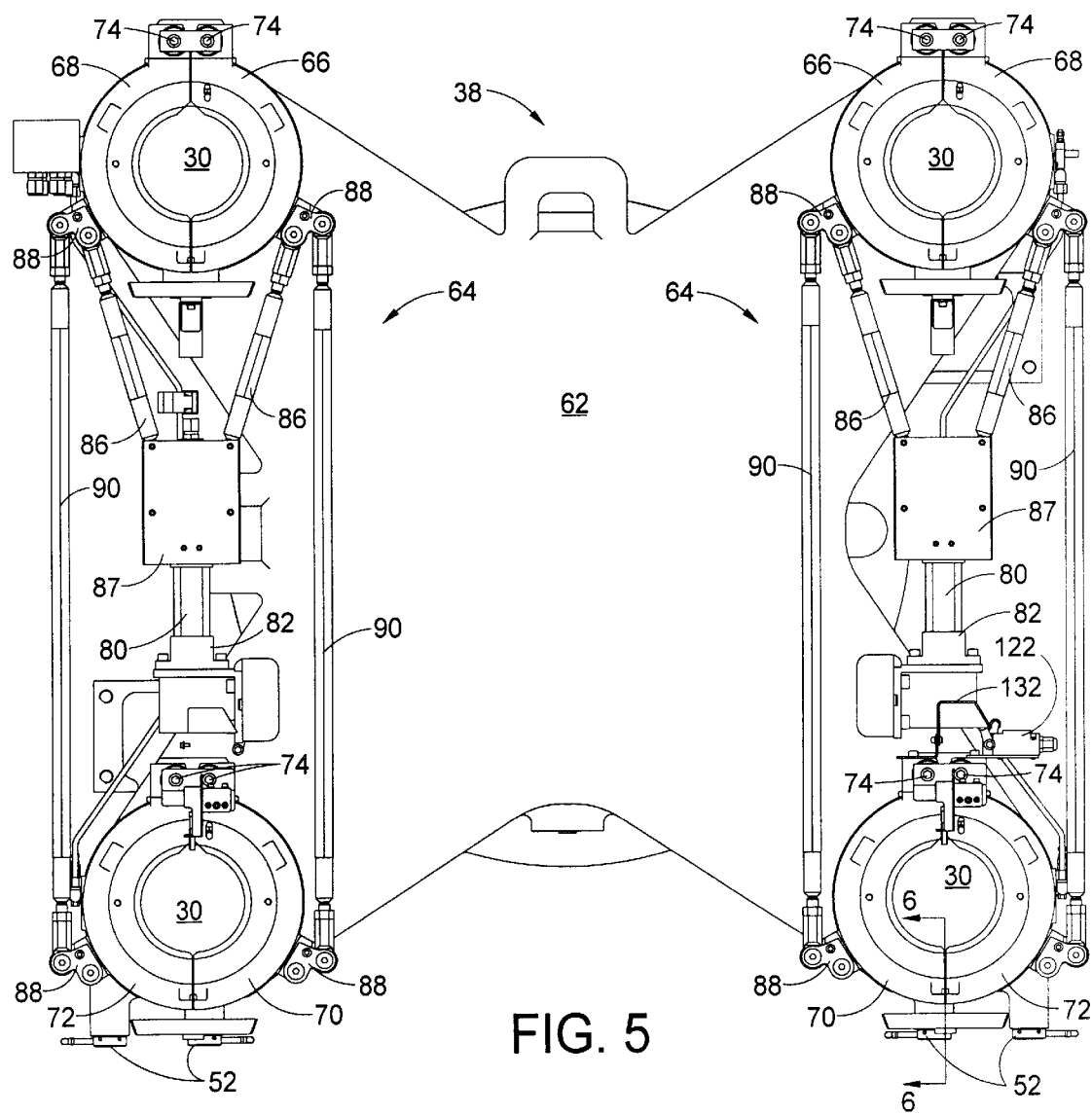
FIG. 5 is a rear elevational view of the cylinder platen shown in FIG. 3.

Referring to FIG. 5, which shows the rear face 62 of the cylinder platen 38, there is provided a pair of locking assemblies 64 for locking the movable platen assembly 37 in a desired position along the strain rods 30 after the movable platen assembly 37 has been moved close to the desired position by the rapid traverse cylinders 43. One such locking system 64 is on the left side of FIG. 5 and another on the right side. Since the locking assemblies 64 are functionally identical, the ensuing description will be based upon the right side locking system 64, as shown in FIG. 5.

Pivotally carried on the rear face 62 of the cylinder platen 38 are a pair of upper split nuts 66, 68 and a pair of lower split nuts 70, 72. The upper split nuts 66, 68 surround and are engageable with the outer surface of the upper strain rod 30, and the lower split nuts 70, 72 surround and are engageable with the outer surface of the lower strain rod 30. Each of the split nuts 66, 68, 70, and 72 constitutes one of a pair of similarly configured strain rod clamping members, and each split nut is pivotally carried on the cylinder platen 38 and is pivotable about a respective individual pivot axis defined by a respective pivot pin 74. The respective pivot pins 74 are laterally spaced from each other so that the upper split nuts 66, 68 and the lower split nuts 70, 72 are supported for independent pivotal movement about their respective pivot axes, and the pivot axes are each closely spaced relative to the axes of adjacent strain rods 30.

Figure 6:
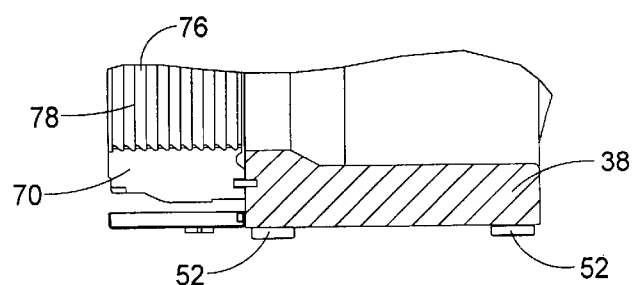
FIG. 6 is a cross-sectional view taken along the line 6—6 of FIG. 5.

Each of the split nuts 66, 68, 70, and 72 includes a strain rod engagement surface (see FIG. 6) defined by a plurality of internal grooves 76, each of which has an axial cross-sectional shape that corresponds with the axial cross-sectional shape of the grooved surfaces 34 of the respective strain rods 30. Thus, as shown in FIG. 6, which is a cross-sectional view showing the split nut 70, the internally grooved engagement surface of the split nut includes a series of teeth having a generally triangular cross-section, wherein the teeth each include a tooth surface 78 that extends transversely relative to the axis of the split nut, in this instance perpendicular to the axis of the split nut. The internally grooved engagement surfaces of the respective split nuts are so sized and configured as to be capable of meshing engagement with the grooved outer surface 74 of a strain rod 30. Consequently, when the split nuts are in their closed position, which is the position in which they are shown in FIG. 5, the respective split nuts each engage the outer periphery of the grooved surface position of a strain rod to effectively lock the split nut, and consequently the movable platen assembly 37, to the strain rod at the desired axial position selected along the respective strain rod.

As best seen in FIGS. 3 and 5, the locking system 64 for the right side of the cylinder platen 38 includes a fluid-operated actuation cylinder 80 that is carried on a cylinder support bracket 82 mounted to a support boss 83 on the rear face 62 of the cylinder platen 38. The actuation cylinder 80 connects to a transversely extending actuator bracket 84, the respective outermost ends of which are pivotally attached a pair of primary links 86. The actuator bracket 84 can be slidably supported for linear vertical movement in a guide plate 87 that is attached to the actuation cylinder 80 and includes a pair of spaced, parallel, linear guide members 89 that slidably receive respective outermost ends of the actuator bracket 84. Each of the primary links 86 extends from the actuator bracket 84 to an outer boss 88 carried on the outer periphery of each of the split nuts. Each of the bosses 88 on the upper split nuts 66 and 68 also pivotally carries a respective secondary link 90 that extends from each of the upper split nuts 66, 68 to a corresponding boss 88 provided on the lower split nuts 70, 72. The primary links 86 and secondary links 90 can include a central link element that is threadedly received in and between a pair of respective end link elements to provide a suitable way of adjusting the lengths of the respective links so that the upper split nuts 66, 68 and lower split nuts 70, 72 move simultaneously, at the same rates, in the same pivotal directions, and over the same distances. However, as will be appreciated by those skilled in the art, other link length adjustment arrangements can be provided as alternatives to the one illustrated in the drawings.

The split nuts are pivotable between a fully engaged position, at which each of the split nuts is in its closed condition so that the upper and lower split nuts completely surround and engage with a respective strain rod 30, as shown in FIG. 5, to a fully disengaged position in which the upper and lower split nuts have each been pivoted outwardly, away from each other, about the respective pivot pins 74 (see FIG. 14) and are disengaged from and spaced away from the surfaces of the respective strain rods.

Movement of the respective split nuts is effected by providing pressurized fluid either to the cap end of the actuation cylinder 80 or to the rod end of the cylinder, depending upon the direction in which the split nuts are intended to be moved. In the position as shown in FIG. 5, the operating piston (not shown) within the actuation cylinder 80 is closest to the cylinder support bracket 82, and the primary links 86 and secondary links 90 are in their lowermost positions. The split nuts are opened by introducing pressurized fluid into the cap end of the actuation cylinder 80, to cause the piston rod to extend, thereby moving the actuator bracket 84 and the respective primary and secondary links in an upward direction, as viewed in FIG. 5, to the relative positions shown in FIG. 14.

Figure 11:
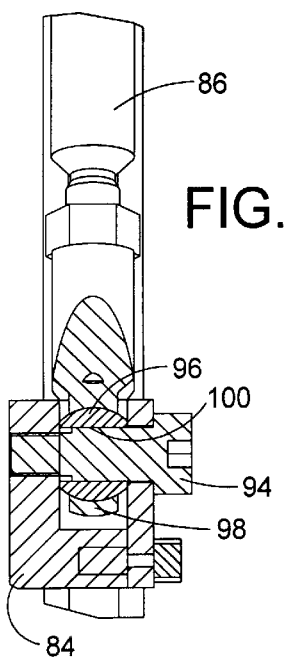
FIG. 11 is a fragmentary side elevational view showing the connection between a primary actuating link and an actuator bracket.
Figure 9:
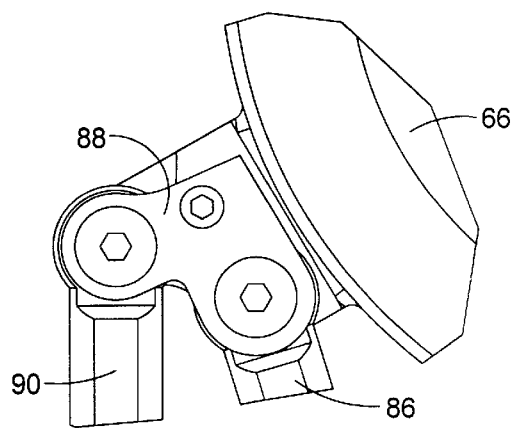
FIG. 9 is an enlarged fragmentary view of a split nut showing the connection boss for connecting actuating links with a split nut in accordance with the present invention.
Figure 10:
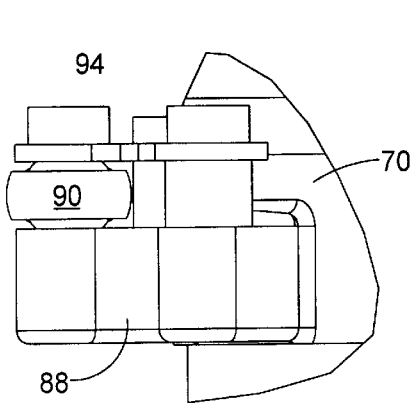
FIG. 10 is an enlarged, fragmentary top view of the split nut and connection boss shown in FIG. 9.

The connections between the primary links 86 and the upper split nut bosses 88 and the secondary links 90 and the upper split nut bosses 88 can be as shown in FIGS. 9 and 10. FIG. 9 shows the link connections at the upper split nut 66, which is typical for all the upper split nuts, while FIG. 10 shows the link connections and the lower split nut 70, which also is typical for all the lower split nuts. Each boss 88 includes a pair of spaced, parallel bores in which the respective link pivot pins 94 are carried. As shown in FIG. 9, the pins 94 each pass through respective apertures formed at the outermost upper ends of each of the links, so that each of the links is pivotable relative to the respective link pivot pin 94. As shown in FIG. 10, a single link pivot pin 94 is provided for pivotal support of the secondary links 90 in a manner similar to the connection described hereinabove for the upper split nuts. And the connection between the primary links 86 and the actuator bracket 84 is shown in FIG. 11, wherein the ends of the primary links 86 are pivotally connected by the pivot pins 94 (only one of which is shown in FIG. 11). FIG. 11 also shows the ball end 96 and socket 98 arrangement to allow for possible misalignment of I the ink pin aperture 100 in the ball end 94 and the link pin 94. The connection arrangement illustrated in FIG. 11 can be provided at each of the link ends for each of the respective links that are part of the split nut locking system 64.

Figure 12:
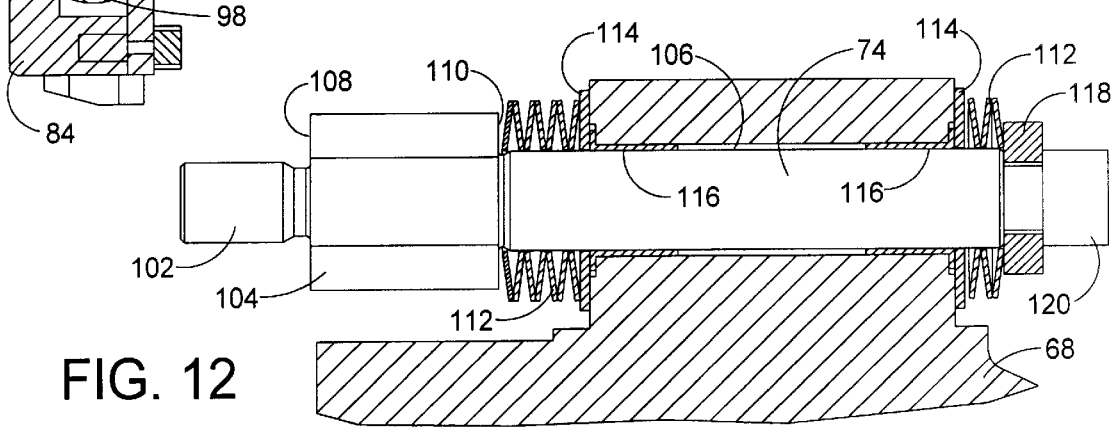
FIG. 12 is a fragmentary view, partially in section, showing a pivot pin for a split nut forming part of the clamping system in accordance with the present invention.

A typical pivotal support for the respective split nuts is shown in enlarged detail and in cross section in FIG. 12. As there shown, the pivot pin 74 includes a threaded innermost end 102 that is adapted to be threadedly received in suitable threaded bores (not shown) provided in the rear face 62 of the cylinder platen 38. An enlarged spacer portion 104 is provided between the threaded end 102 and the bearing surface 106 of the ivot pin 74 to define a stop surface 108 to engage the outer surface of the cylinder platen 38 when pivot pin 74 is fully threaded into its operative position. The axially outermost face of spacer 104 defines an annular flange 110 against which a plurality of alternately positioned Belleville springs 112 are positioned to spring bias the split nut 68 outwardly, away from the rear surface 62 of the cylinder platen 38. The outermost of the springs 112 bears against a wear washer 114, on the outermost side of which is positioned a flanged bearing 116 to receive the pivot pin bearing surface 106. A similar bearing, washer, and spring arrangement is provided at the outermost end of the pivot pin 74, and a spring retainer plate 118 and a cap screw 120 are provided to maintain the respective parts in their desired functional positions. As shown, the split nut 68 is capable of rotation relative to the pivot pin 74, and it is also capable of axial movement along the bearing surface 106. In that regard, the respective Belleville springs 112 serve to space the rear face of the split nut 68 away from the rear face of the cylinder platen 38 to minimize the frictional forces that would otherwise exist between the split nut and the rear face of the cylinder platen 38 as the split nuts are pivoted about the pivot pin 74.

Figure 13:
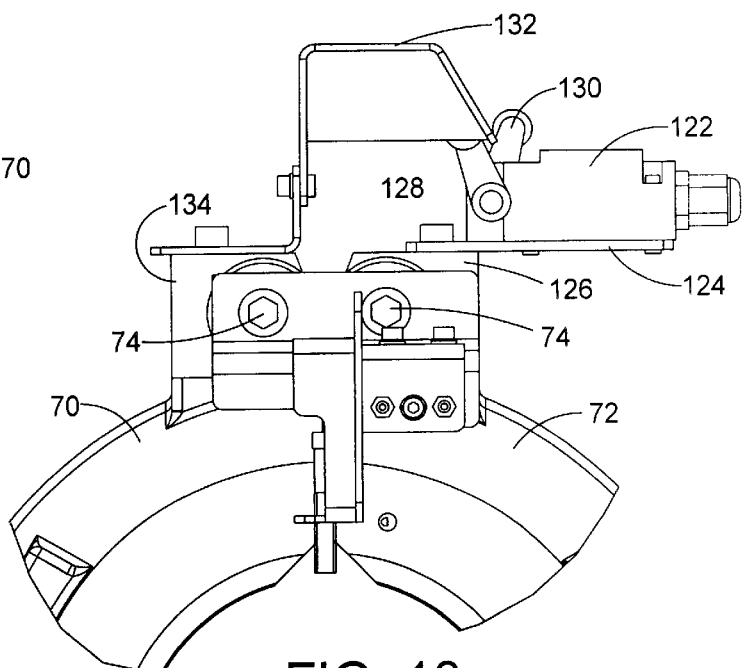
FIG. 13 is a fragmentary view showing a split nut position sensing switch.

The positions of the split nuts, whether in opened or closed condition, can be detected by a suitable position sensors. As shown in FIG. 5, split nut position sensors 122 are carried on a support bracket 124 that is attached to an upper boss 126 on the lower split nut 72. Each sensor 122 operates to sense the open or closed condition of the lowermost split nut, although it could, if desired, be positioned to sense the open or closed condition of one of the upper split nuts. FIG. 13 shows in greater detail the arrangement for sensing the positions of the split nuts 70 and 72. Preferably, two positions sensor 122 are provided (only one is visible in FIG. 13), having pivotable switch arms 128, 130 that are adjacent sensor arm actuators 132. The sensor arm actuators 132 are carried on an upper boss 134 formed on the split nut 70. Thus, the sensors 122 and arm actuators 132 are carried at the uppermost surfaces of one pair of cooperating split nuts. When the split nuts 70 and 72 are in their closed positions, as shown in FIG. 13, the switch arm 128 is deflected by one of the actuators 132 to provide a signal from the sensor 122 indicative of the split nut closed position. Similarly, when the split nuts 70 and 72 are pivoted to the open positions, in which they are disengaged from a strain rod, the relative movement between another sensor arm actuator 132 and the second sensor 122 moves the switch arm 130 to provide a signal indicative of the fact that the split nuts are in their open positions. The respective positions of the several parts constituting locking system 64 when the split nuts are in their open positions are shown in FIG. 14.

Figure 14:
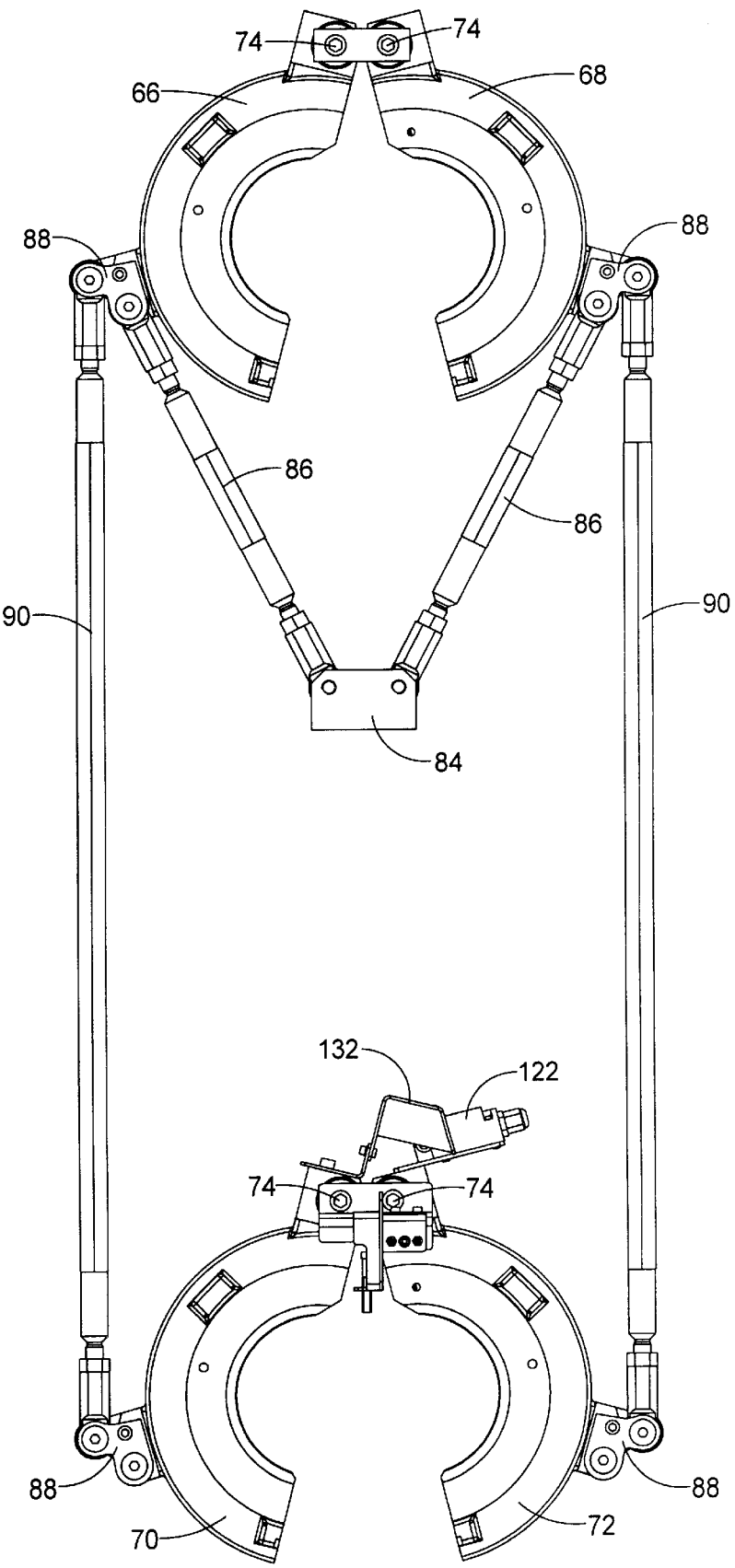
FIG. 14 is a fragmentary elevational view of the split nut actuating system with the split nuts in their open positions.

In operation, the split nuts are initially in the open position, as shown in FIG. 14, to enable the movable platen assembly 37 to be moved to a desired position relative to the stationary platen 24 and along the strain rods 30 by the traverse cylinders 43. When the movable platen assembly 37 is moved closer to the stationary platen 24, so that the mold halves (not shown) carried on the opposed faces of the respective platens are spaced from each other a distance of the order of about 0.25 inches or less, pressurized hydraulic fluid is introduced into the respective actuating cylinders 80. Operating the actuating cylinders 80 causes the respective actuator brackets 84 to move downwardly, toward machine base 16, thereby pulling each of the primary links 86 downwardly to move the upper split nuts 66, 68 into the closed position around the grooved surface portions 34 of their respective strain rods 30, which simultaneously moves the secondary links 90 in a downward direction to move lower split nuts 70, 72 into the closed position around the grooved surface portions 34 of their respective strain rods 30. When those split nut movements have been completed, the position sensor 122 provides a signal that the movable platen assembly 37 is locked in position relative to the strain rods 30. Pressurized hydraulic fluid can then be introduced into the pancake cylinder 44 to cause the pancake ram 46 to bring the mold halves into tightly contacting relationship. Because the pancake cylinder 44 and pancake ram 46 each have a relatively large diameter, the fluid pressure exerted over the relatively large area of the pancake ram 46 results in a large clamping force that is applied to the contacting mold halves so that when molten plasticated material is injected into the mold cavity at high pressures the mold halves will not separate from each other and will form the desired molded part without mold parting line flash.

Although particular embodiments of the present invention have been illustrated and described, it will be apparent to those skilled in the art that various changes and modifications can be made without departing from the scope of the present invention. Accordingly, it is intended to encompass within the appended claims all such changes and modifications that fall within the scope of the present invention.

What is claimed is:

1. Mold clamping apparatus for moving a pair of mold halves into and out of contacting relationship, said apparatus comprising:

a) a stationary platen having a first face for carrying a first mold half;

b) a plurality of strain rods extending from the first face of the stationary platen, the strain rods including a smooth outer surface portion and a grooved outer surface portion;

c) a movable platen slidably carried on the strain rods for movement toward and away from stationary platen, the movable platen having a front face and a rear face, wherein the front face is opposed to the first face of the stationary platen for carrying a second mold half that is cooperable with the first mold half to define a mold cavity therebetween; and d) locking apparatus carried by the movable platen for engaging the grooved outer surface portion of the strain rods, the locking apparatus including at least one pair of pivotable split nuts having grooved inner surfaces that are engageable with the grooved outer surface portion of a strain rod and that are pivotable between a first, engaged position at which the split nuts each engage the grooved outer surface portion of a strain rod, and a second, disengaged position at which the split nuts are each spaced outwardly from the strain rod outer surface, each split nut individually pivotably carried on a respect pivot pin extending from the movable platen, wherein the pivot axes of the respective split nuts are substantially parallel to each other and are spaced from each other.

2. Mold clamping apparatus in accordance with claim 1 wherein the split nuts are carried adjacent the rear face of the movable platen and are spring-biased away from the movable platen rear face for reducing frictional drag and wear of the split nuts when they are pivoted relative to the movable platen rear face.

3. Mold clamping apparatus in accordance with claim 2 including a plurality of Belleville springs positioned between the split nuts and the rear face of the movable platen for spring-biasing the split nuts.

4. Mold clamping apparatus in accordance with claim 3 wherein the springs are carried on split nut pivot pins.

5. Mold clamping apparatus in accordance with claim 1 wherein at least one pair of split nuts includes a split nut position sensor to provide a signal indicative of opened and closed positions of the split nuts.

6. Mold clamping apparatus in accordance with claim 1 including a pair of traverse cylinders carried by the stationary platen and connected with the movable platen for rapidly traversing the movable platen along the strain rods.

7. Mold clamping apparatus in accordance with claim 1 wherein the movable platen includes a cylinder that opens on its front face, and a clamping piston slidably carried within the cylinder for movement toward and away from the stationary platen.

8. Mold clamping apparatus in accordance with claim 7 wherein the clamping piston is connected to a mold mounting platen that carries the second mold half.

9. Mold clamping apparatus in accordance with claim 1 wherein the grooved outer surface portions of the strain rods include grooves having a substantially triangular cross-section.

10. Mold clamping apparatus in accordance with claim 9 wherein a load bearing face of the triangular groove cross-section is substantially perpendicular to the longitudinal axis of the strain rod.

11. Mold clamping apparatus in accordance with claim 1 wherein the halves of the split nuts each include external bosses that pivotally support split nut actuation links.

12. Mold clamping apparatus in accordance with claim 1 including primary links that extend from a split nut actuator to a respective split nut for simultaneously pivotally moving each split nut.

13. Mold clamping apparatus in accordance with claim 12 wherein the primary links each have the same length for pivotally moving each split nut through the same degree of arc.

14. Mold clamping apparatus in accordance with claim 1 including secondary links that extend from respective ones of a first pair of split nuts to respective ones of a second pair of split nuts for simultaneous movement of the first and second pairs of split nuts.

15. Mold clamping apparatus in accordance with claim 14 wherein the secondary links each have the same length for pivotally moving each second split nut through the same degree of arc.

16. Mold clamping apparatus in accordance with claim 14 wherein the first and second pairs of split nuts each move simultaneously through the same degree of arc.

17. Mold clamping apparatus in accordance with claim 12 wherein the actuator is an actuation cylinder that has a longitudinal axis that extends substantially vertically.

18. Mold clamping apparatus in accordance with claim 17 wherein the actuation cylinder includes a cap end that is positioned below a rod end of the cylinder.

19. Mold clamping apparatus for an injection molding machine comprising:

a) a machine base including a pair of laterally spaced, substantially parallel support rails;

b) a stationary platen secured to the base across the support rails, the stationary platen including a front face and a rear face, the rear face including mold support surface for supporting a first mold half;

c) a plurality of spaced, parallel strain rods extending from the rear face of the stationary platen, each strain rod including a smooth-surface portion having a uniform cross section and a locking portion having a plurality of external, axially-spaced, annular grooves;

d) a movable platen carried on the strain rods for sliding movement therealong toward and away from the stationary platen, the movable platen including a front face disposed opposite the rear face of the stationary platen for supporting a second mold half that is cooperatively engageable with the first mold half to define a closed mold cavity therebetween, the movable platen including a rear face facing in a direction opposite from that of the movable platen front face;

e) locking apparatus carried on the rear face of the movable platen for locking the movable platen to the locking portion of the strain rods, the locking apparatus including a first pair of split nuts each pivotally supported by the movable platen for pivotal movement relative to the strain rods longitudinal axis about respective spaced pivot axes and between an engaged position in which each of the split nuts is engaged with the locking portion of a first strain rod and a disengaged position, a fluid-operated cylinder carried by the movable platen for moving an actuator plate between a locked position and an unlocked position, a pair of first links extending from the actuator plate to respective halves of a first split nut and connected with the split nuts at points spaced from the respective split nut pivot axes, and a pair of second links each extending from one of the halves of the first split nut to a corresponding half of a second split nut surrounding a second strain rod, wherein the second split nut halves are each individually pivotable about respective spaced pivot axes, whereby movement of the actuator plate by the fluid-operated cylinder simultaneously pivots the respective halves of each of the first and second split nuts between an engaged position, wherein the split nuts securely engage the locking portions of the respective strain rods to block movement of the movable platen along the strain rods, to a disengaged position, wherein the split nuts are pivoted away from the respective strain rods to disengage from the strain rod locking portions to permit relative movement of the movable platen along the strain rods.

* * * * *